US007334361B2

(12) United States Patent
Schrimpf et al.

(10) Patent No.: US 7,334,361 B2
(45) Date of Patent: Feb. 26, 2008

(54) ACCESS SYSTEM FOR A DISPLAY PANEL ASSEMBLY

(75) Inventors: Jesse E. Schrimpf, Menomonee Falls, WI (US); Kelly J. Bronk, Milwaukee, WI (US); Scott S. Liebert, West Bend, WI (US); Gregory P. Schleusner, Waukesha, WI (US)

(73) Assignee: Adaptive Micro Systems LLC, Milwaukee, WI (US)

( * ) Notice: Subject to any disclaimer, the term of this patent is extended or adjusted under 35 U.S.C. 154(b) by 161 days.

(21) Appl. No.: 11/092,121

(22) Filed: Mar. 29, 2005

(65) Prior Publication Data

US 2006/0218828 A1 Oct. 5, 2006

(51) Int. Cl.

| | |
|---|---|
| ***G09F 3/04*** | (2006.01) |
| ***E05D 11/06*** | (2006.01) |
| ***E05D 15/32*** | (2006.01) |
| ***E05D 5/02*** | (2006.01) |
| ***E05F 1/08*** | (2006.01) |
| ***F21V 1/00*** | (2006.01) |
| ***F21V 7/00*** | (2006.01) |
| ***F21V 23/02*** | (2006.01) |
| ***B60J 7/057*** | (2006.01) |
| ***B60J 5/00*** | (2006.01) |

(52) U.S. Cl. ............................ 40/452; 16/360; 16/370; 16/288; 16/389; 362/241; 362/247; 362/260; 296/223; 296/146.11; 296/146.4

(58) Field of Classification Search .................. 40/452; 16/354, 286, 288, 287, 366, 370; 49/246, 49/248, 249, 345

See application file for complete search history.

(56) References Cited

U.S. PATENT DOCUMENTS

| | | | | |
|---|---|---|---|---|
| 1,864,164 | A * | 6/1932 | Aldeen | 16/360 |
| 1,965,316 | A | 7/1934 | Predmore | |
| 3,470,579 | A | 10/1969 | Cencioni | |
| 4,970,812 | A * | 11/1990 | Tanaka et al. | 40/452 |
| 5,062,182 | A | 11/1991 | Griffiths et al. | |
| 5,229,109 | A * | 7/1993 | Grimm et al. | 424/85.2 |
| 5,299,109 | A * | 3/1994 | Grondal | 362/241 |
| 6,618,904 | B1 * | 9/2003 | Nagy | 16/370 |

FOREIGN PATENT DOCUMENTS

JP 4-11181 1/1992

* cited by examiner

*Primary Examiner*—Lesley D. Morris
*Assistant Examiner*—Syed A Islam
(74) *Attorney, Agent, or Firm*—Foley & Lardner LLP

(57) ABSTRACT

A system for accessing internal electrical components of an LED display panel assembly includes a case and a display panel having a plurality of LEDs on an outer surface and electrical components on an inner surface. A linkage assembly is coupled to an inner surface of the case and the inner surface of the display panel and configured for generally translational and generally rotational movement of the display panel from a closed position to an open position for accessing the electrical components.

18 Claims, 10 Drawing Sheets

ACCESS SYSTEM FOR A DISPLAY PANEL ASSEMBLY

FIELD

The present invention relates to an access system for a display panel assembly. The present invention relates more particularly to an access system for an electronic message center configured to move a display panel outward and downward, and to improve stability of the panel during movement.

BACKGROUND

Display panel assemblies (such as message boards and alphanumeric signs) for conveying information such as messages and other types of information to an observer are generally known. The display panel assemblies may include illumination devices such as an array of light emitting diodes (LEDs) configured to illuminate in predetermined colors and/or patterns to create words (in any suitable language) or images for conveying information to observers. Typical display panel assemblies include an enclosure such as a case for housing electronic components such as power supplies, signal control devices, circuit boards, wiring, etc. Usually, one side of the enclosure (such as a "front" side) includes a display panel or the like intended for conveying information to an observer. Typical display panels often have LED assemblies (such as LED blocks, pixels and/or display boards) mounted to a front side of the panel and associated electronic components mounted to a rear side of the panel. Multiple display panel assemblies are often combined together to create a "large" display (such as by "stacking" the display panel assemblies atop and/or aside one another). In order to provide access to the electronic components mounted to a rear side of the display panel and inside the enclosure (e.g. for maintenance, repair, calibration, upgrade, etc.), the enclosure typically includes a movable panel (such as an access door or the like) on a rear side of the enclosure. However, such known display panel assemblies tend to have certain disadvantages. For example, display panel assemblies may be mounted on or within structures (e.g. monuments, walls, etc.) that make access through a rear side of the case inconvenient or impractical.

Other known display panel assemblies are configured for front-access movement of the display panel (such as by a hinge that pivots the display panel about a bottom edge of the enclosure) so that the electronic components mounted on a rear side of the display panel can be accessed from a front side, without entering through the rear side of the enclosure. However, such display panel assemblies having front-access display panels also tend to have certain disadvantages. For example, the typical hinges for such front-access display panels often pivot the display panel about a single axis of rotation which tends to create interference between the lower outward edge of the display panel and the top outward edge of another (i.e. lower) display panel in "large" display panel assemblies. Likewise, a similar condition can occur for display panels hinged along one of the vertical side edges. Also, such conventional hinges tend to permit instability of the display panel during opening and closing movement (e.g. racking or twisting of the panel, contact with adjacent display panels, etc.). Further, the conventional hinges often are not configured to support the weight or opening motion of the display panel, which can lead to unintended "dropping" of the panel to the open position and damage to the display panel, electronic components, the enclosure, and adjacent display panels. In addition, hinge devices on conventional front-access display panel assemblies often have at least certain portions extending external to the enclosure, which tends to increase the separation distance between adjacent display panel assemblies in a large display and detracts the intended appearance of one large integrated display.

Therefore, it would be desirable to provide an access system for a display panel assembly that permits the components of the display panel assembly to be accessed from a front side. It would also be desirable to provide an access system for a display panel assembly that avoids interference between display panels during opening and closing of the display panel. It would also be desirable to provide an access system for a display panel assembly that guides and improves the stability of the display panel during opening and closing. It would also be desirable to provide an access system for a display panel assembly that at least partially supports the weight of the display panel during opening to improve the control of the opening operation and minimize the potential for damage to the display panel assembly. It would further be desirable to provide an access system with its operable components located within the display panel assembly to permit individual display panel assemblies in a large display to be positioned as close together as possible.

Accordingly, it would be desirable to provide an access system for a display panel assembly having any one or more of these or other advantageous features.

SUMMARY

One embodiment of the invention relates to an access system for a display panel assembly. The access system includes a case and an LED display panel coupled to a front of the case for movement between a closed position and an open position. A linkage assembly is coupled to an inside surface of the case and an inside surface of the LED display panel, and configured to move the LED display panel in a first generally non-rotational direction and a second generally rotational direction.

Another embodiment of the invention relates to an access system for an LED display panel assembly. The access system includes an enclosure and a display configured to cover a front opening of the enclosure. The display panel is movable between a closed position and an open position to provide access to components installed on at least one of the enclosure and the display panel. A linkage mechanism is coupled to the enclosure and the display panel for generally translational movement of the display panel from the closed position to a partially open position and for generally rotational movement of the display panel from the partially open position to the open position. A guide member is coupled to the linkage mechanism and is configured to engage a structural component of the enclosure as the display panel is moved between the closed position and the open position.

A further embodiment of the invention relates to a system for accessing internal electrical components of an LED display panel assembly. The system includes a case and a display panel having a plurality of LEDs on an outer surface and electrical components on an inner surface. A linkage assembly is coupled to an inner surface of the case and to the inner surface of the display panel. The linkage assembly is configured for generally translational and generally rotational movement of the display panel from a closed position to an open position for accessing the electrical components.

DETAILED DESCRIPTION

Figure 1:
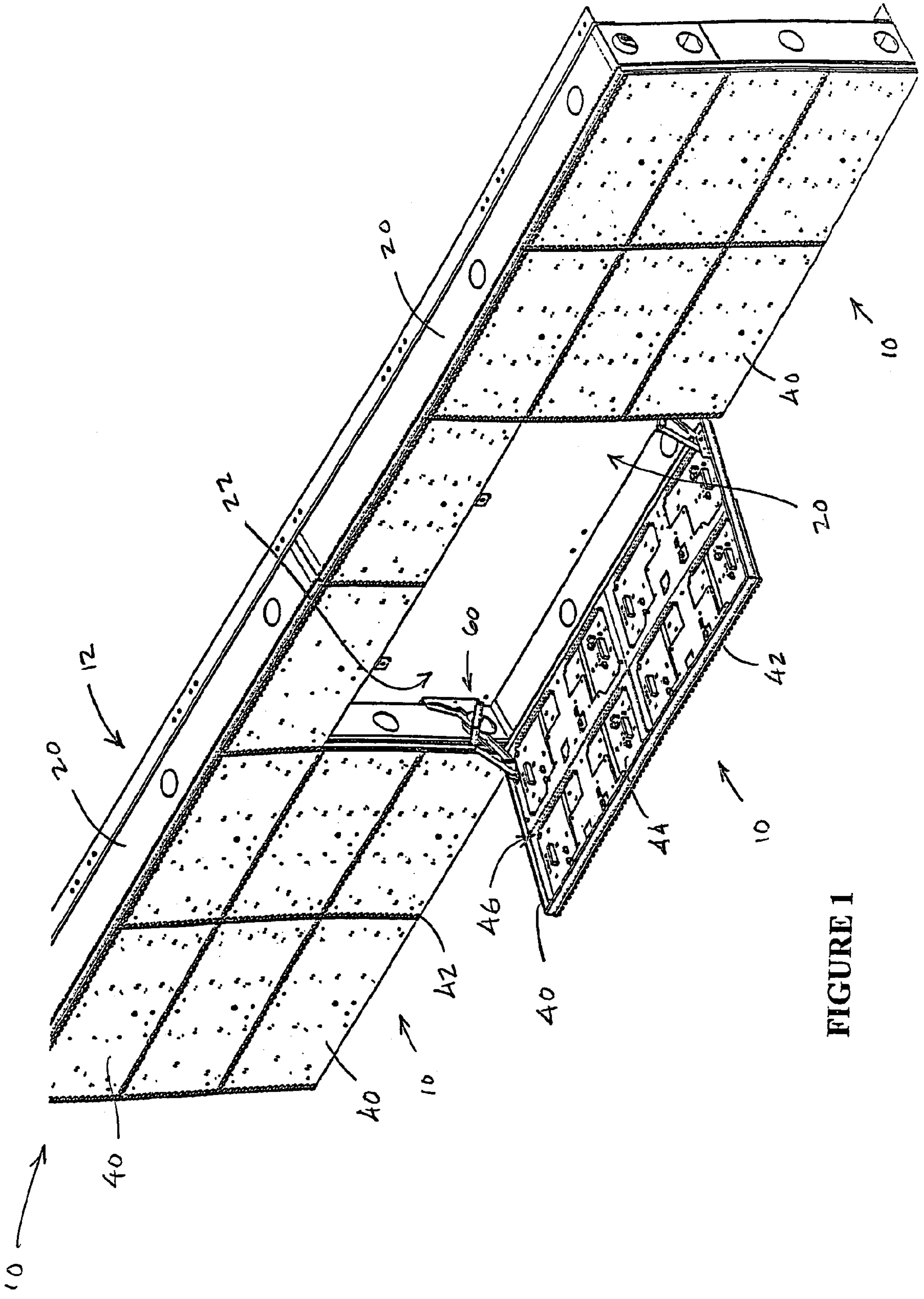
FIG. 1 is a schematic representation of a front perspective view of a large display with an access system for a display panel assembly according to one embodiment.

Referring to the FIGURES, an access system for a display panel assembly 10 is shown according to one embodiment. The display panel assembly according to the illustrated embodiment is shown to include a case 20 and a front-access, movable display panel 40. The access system is shown to include a linkage assembly 60 or mechanism having brackets mountable to inner surface of the case and the display panel, and link members that movably couple the case to the display panel. When the display panel is in the closed position, the link members are sized and connected in a manner that permits the display panel to move in a generally "outward" direction a sufficient distance to "clear" an adjacent display panel (e.g. a "lower" display panel in a large display), and then move in a generally rotational direction so that the components on the back of the display panel may be accessed without damaging adjacent display panels and components.

The link members are also shown to include guide members that are configured to interface with structure in the case as the display panel is moved toward the open position. The guide members are intended to improve the stability of the display panel during opening and closing so that twisting or racking of the display panel and contact with adjacent-side display panels is minimized. According to one embodiment, the link members include a spring member coupled to the case and that operate with guide members (e.g. "low friction guide members") that are intended to "slide" along the structure in the case with a generally constant and minimal frictional resistance as the display panel is moved between the open and closed positions to reduce or prevent "scrapping" or "grinding" between the linkage assembly and the case. The spring member is intended to at least partially offset the increasing force due to the weight of the panel and the increasing distance between the display panel's center of gravity and the linkage assembly as the display panel is opened. According to another embodiment, the link members are shown as provided without a spring member and the guide members are shown to have a "wedge" shape configured to interface with structure in the case in a progressive frictional interaction as the display panel is opened (e.g. "progressive friction guide members"). The frictional interaction is intended to provide increasing resistance during opening of the display panel to at least partially offset the increasing force due to the weight of the panel and the increasing distance between the display panel's center of gravity and the linkage assembly as the display panel is opened. The access system may be provided with low friction guide members (with or without a spring member depending on, for example, the weight of the display panel) or a progressive friction guide member for controlling movement of the display panel. The access system is shown and described for use with an enclosure such as a case, but may be used with a display panel connected to any suitable structure. Also, the brackets, link members, spring members and guide members are shown having a particular number and configuration, however, the linkage assembly may be provided with any suitable number of link members and guide members located on any suitable link to engage any suitable structure of the display panel assembly. Further, the access system may be used with display panels having any suitable device (e.g. lamps, bulbs, fiber optics, etc.) for conveying information.

Figure 2:
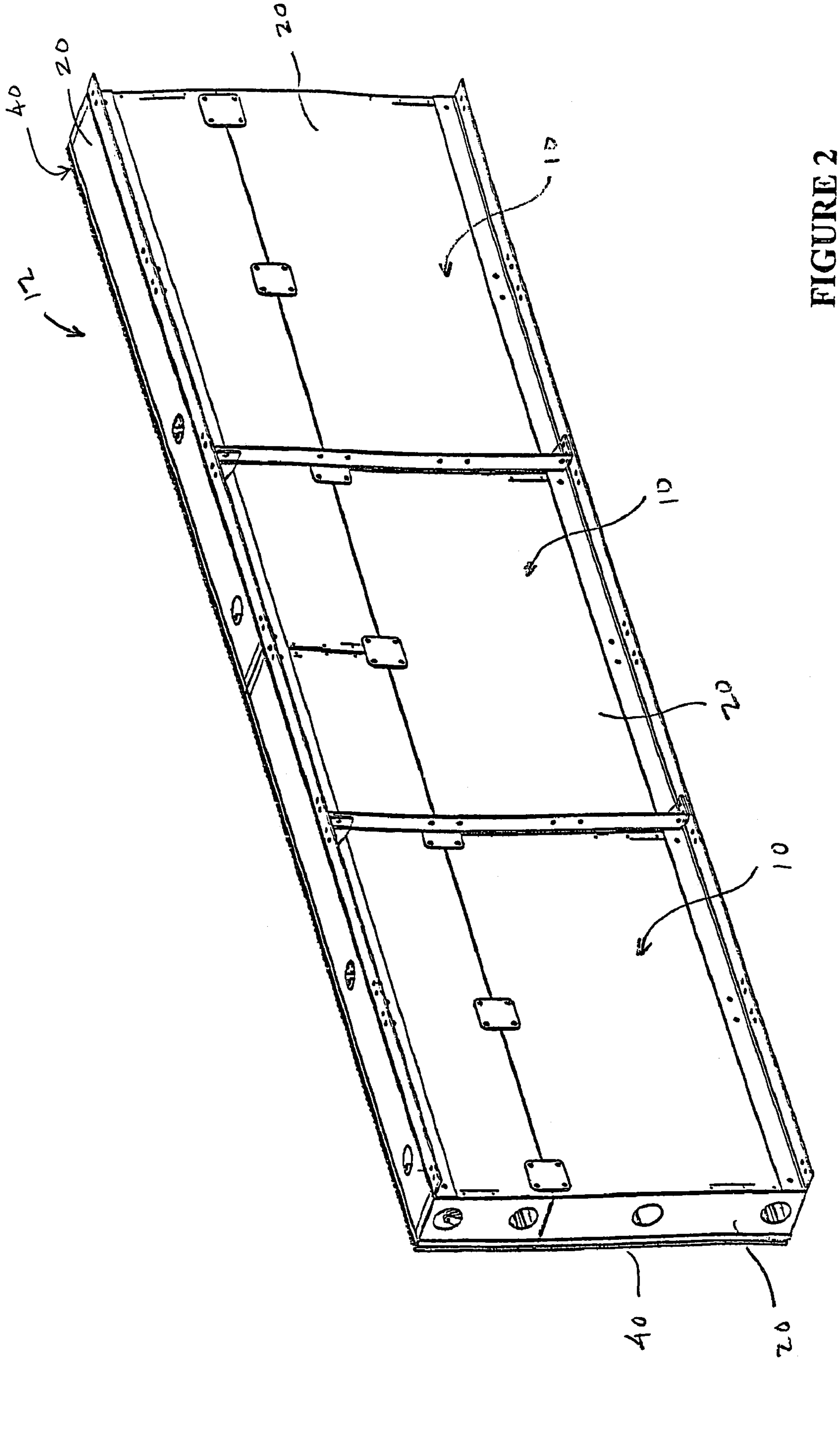
FIG. 2 is a schematic representation of a rear perspective view of a large display according to one embodiment.
Figure 3:
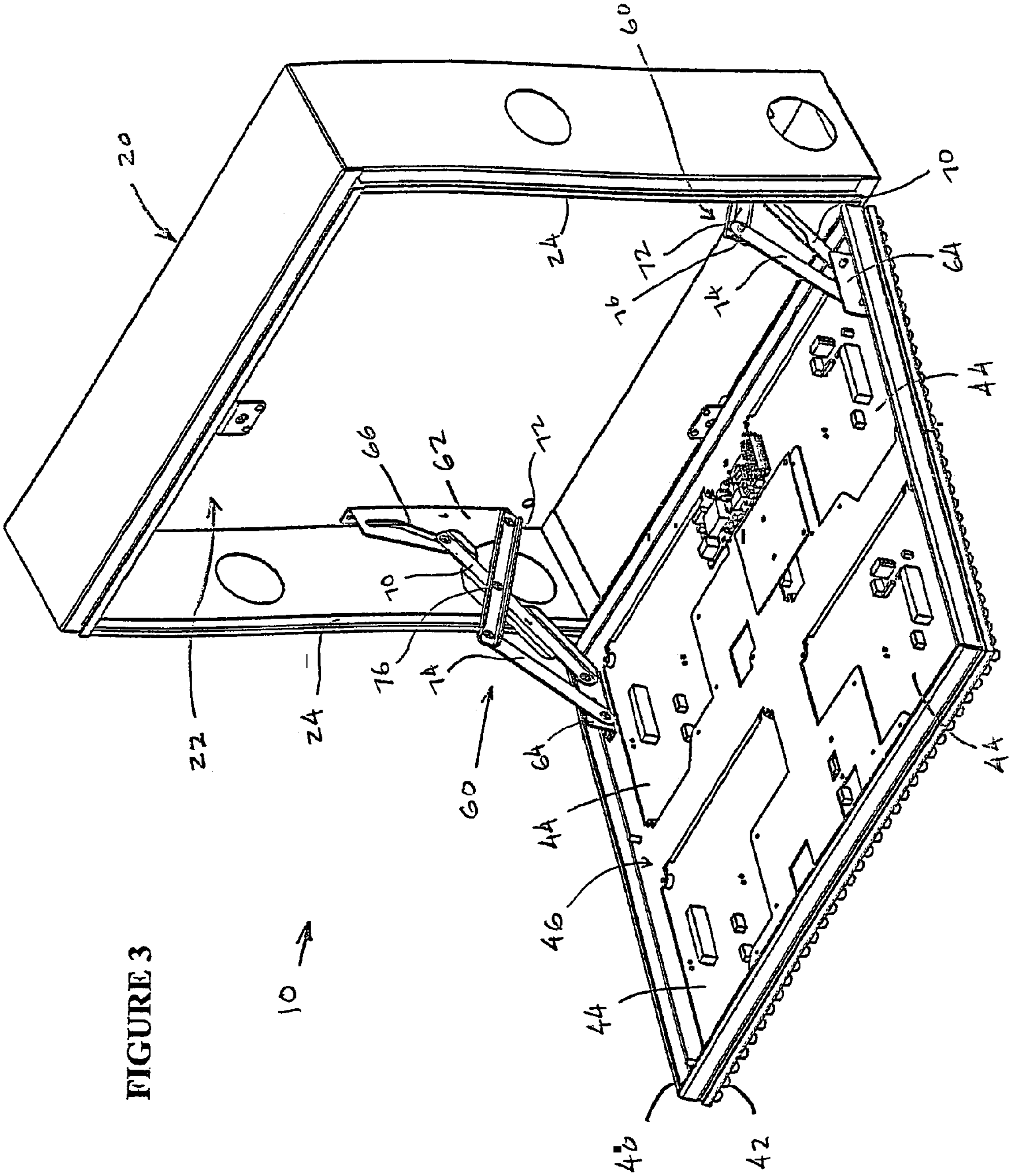
FIG. 3 is a schematic representation of a front perspective view of the access system for a display panel assembly of FIG. 1.

Referring to FIGS. 1 and 2, the access system is shown for use with a plurality of individual display panel assemblies 10 that are combined to form a large display 12. Such large displays and display panel assemblies may be mounted within or on a monument or other structure that usually makes rear-access to the display panel assemblies difficult or impractical. Accordingly, the display panel assemblies 10 are shown having a front-access display panel 40 coupled to an enclosure 20 (e.g. box, case, etc.) by a linkage assembly 60. Display panel assemblies 10 are shown to include an array of LEDs 42 on a front surface and a plurality of associated electronic components 44 (e.g. circuit boards, converters, power supplies, connectors, control signal transmitters and receivers, etc.) mounted on a rear surface 46 of the display panel 40. The front-access display panel 40 permits access to the electronic components 44 through a front of the display panel assembly 10 by moving the display panel 40 from a closed position to an open position. During the opening operation, the linkage assembly 60 is configured to move the display panel 40 in an outwardly direction (e.g. translational movement) to "clear" adjacent lower display panels (not shown) and then to "tilt" downward (e.g. rotational movement) for access to the electronic components 44.

Referring to FIGS. 3-5B, the linkage assembly 60 of the access system for a display panel assembly is shown schematically according to one embodiment as two linkage systems. Linkage system 60 is shown to include a first bracket 62 coupled to each side of an inner rear wall 22 of case 20 (e.g. by suitable fasteners such as screws, rivets, interlocking tabs and slots, etc.). Linkage system 60 is also shown to include a second bracket 64 coupled to each side of an inner rear surface 46 of the display panel 40. Each linkage assembly 60 is further shown to include link members (shown for example as three link members 70, 72, 74) operably interconnecting the first bracket and the second bracket for translational and rotational movement when the display panel is moved from a closed position to an open position. Linkage assembly 60 may also include a spring member 61 such as shown in FIGS. 4A-5B interconnecting link member 72 and first bracket 62. According to an alternative embodiment, for applications that include the spring member, the spring member may be connected to any suitable linkage and to any suitable portion of the first bracket (or directly to other structure within the case).

Referring further to FIGS. 4A-5B, the first bracket 62 is shown to include an angled slot 66 (e.g. cam, track, channel, etc.) formed therein and configured to receive a slide member 68 mounted on a first end of a first link member 70. The slide member 68 may be a roller, adjustable threaded fastener (e.g. to allow for variable tension, etc.) or a bushing or a plug formed from a wear-resistant material (e.g. Nylon® or the like) configured to slide within or along slot 70 as the display panel 40 is moved between the open and closed positions. A second end of first link 70 is pivotally connected to a bottom end of second bracket 64 on the display panel 40. A second link member 72 is shown having a first end pivotally coupled to a lower portion of the first bracket 62 and an intermediate portion pivotally coupled to an intermediate portion of the first link member at a pivot point 76. A third link member 74 is shown having a first end coupled to a second end of the second link 72 and a second end coupled to a top portion of the second bracket 64.

Figure 4A:
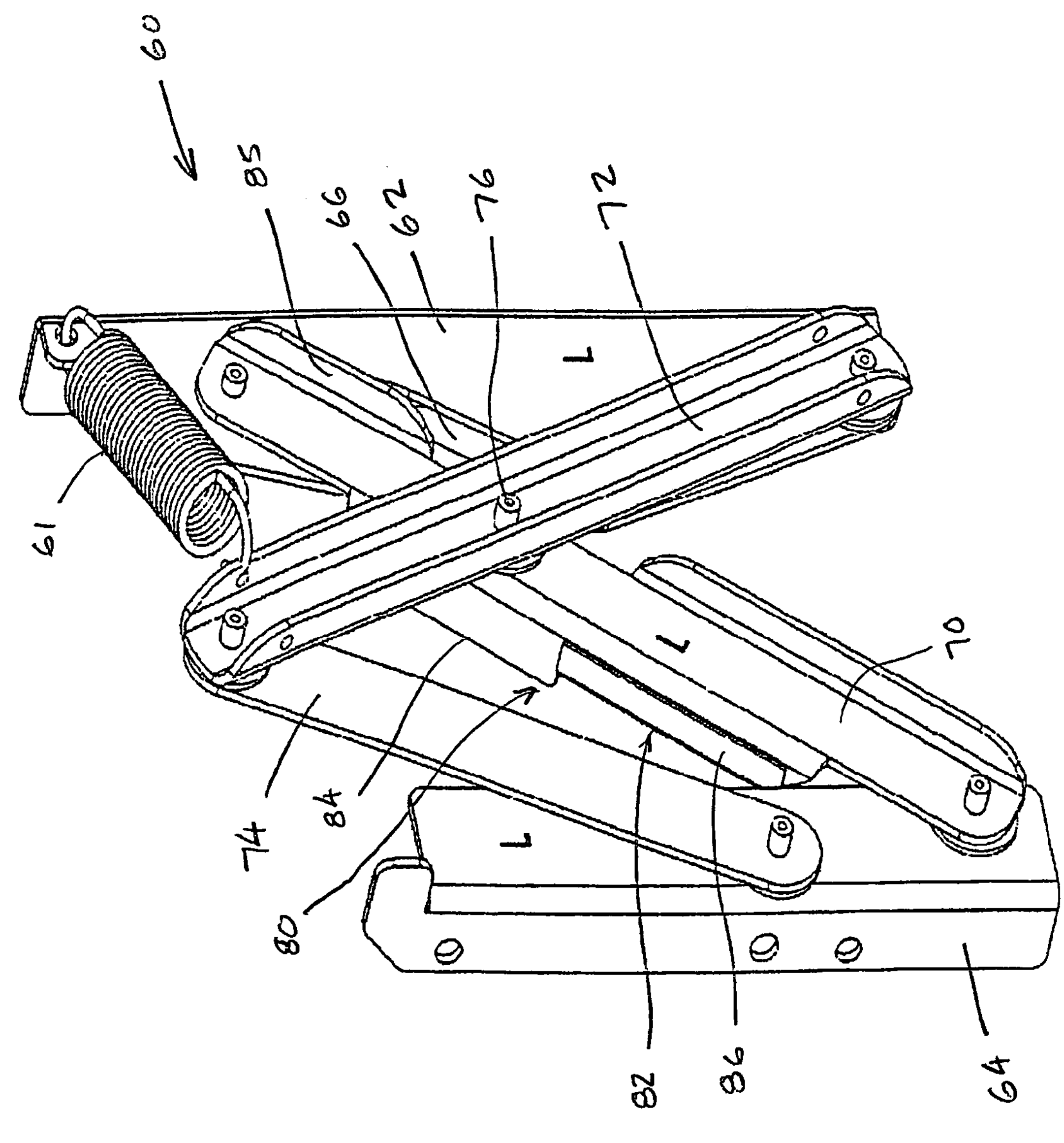
FIG. 4A is a schematic representation of a front perspective view of a portion of the access system for a display panel assembly of FIG. 1 in one position according to an embodiment.
Figure 4B:
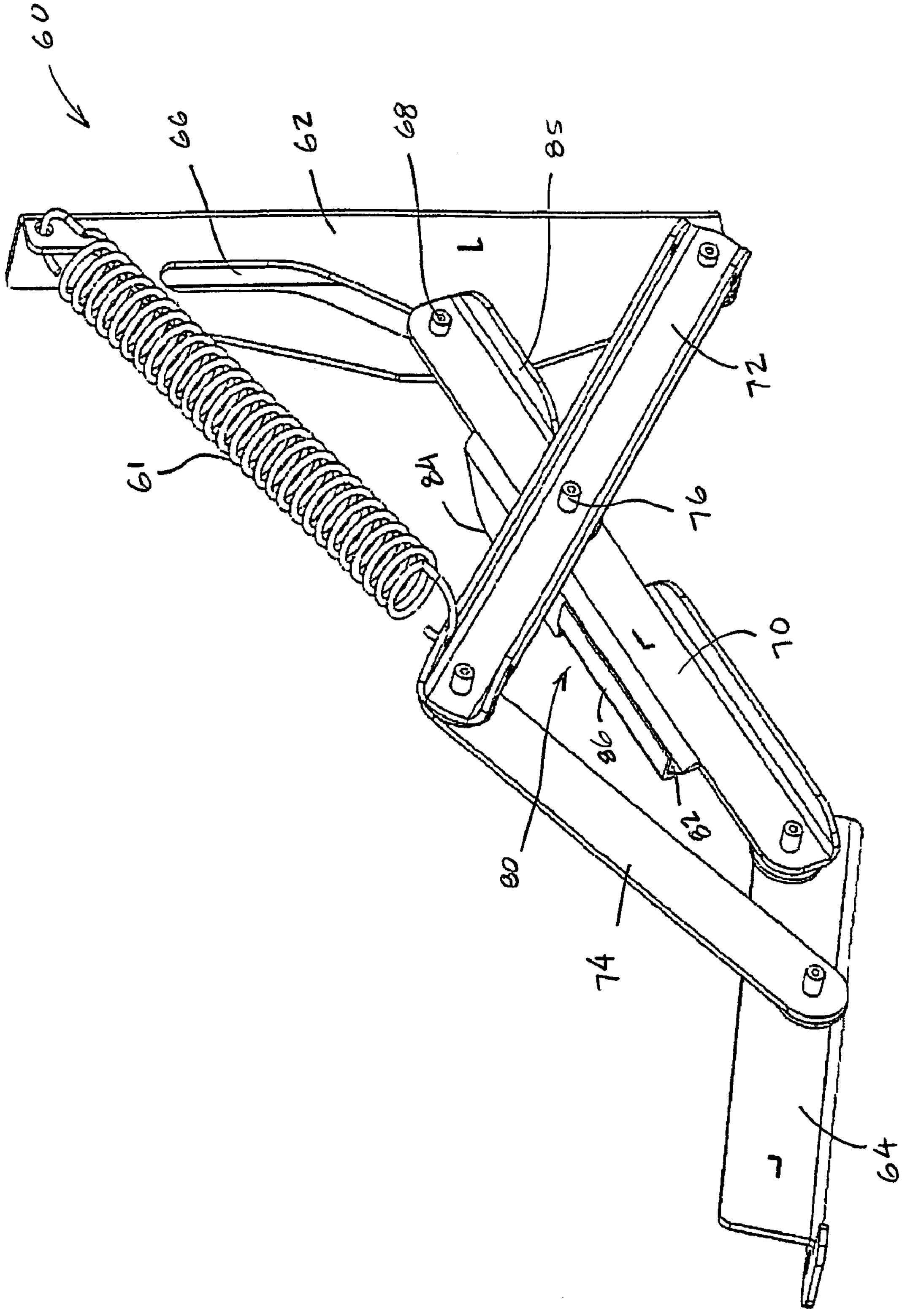
FIG. 4B is a schematic representation of a front perspective view of the portion of the access system for a display panel assembly of FIG. 4A in another position.
Figure 5A:
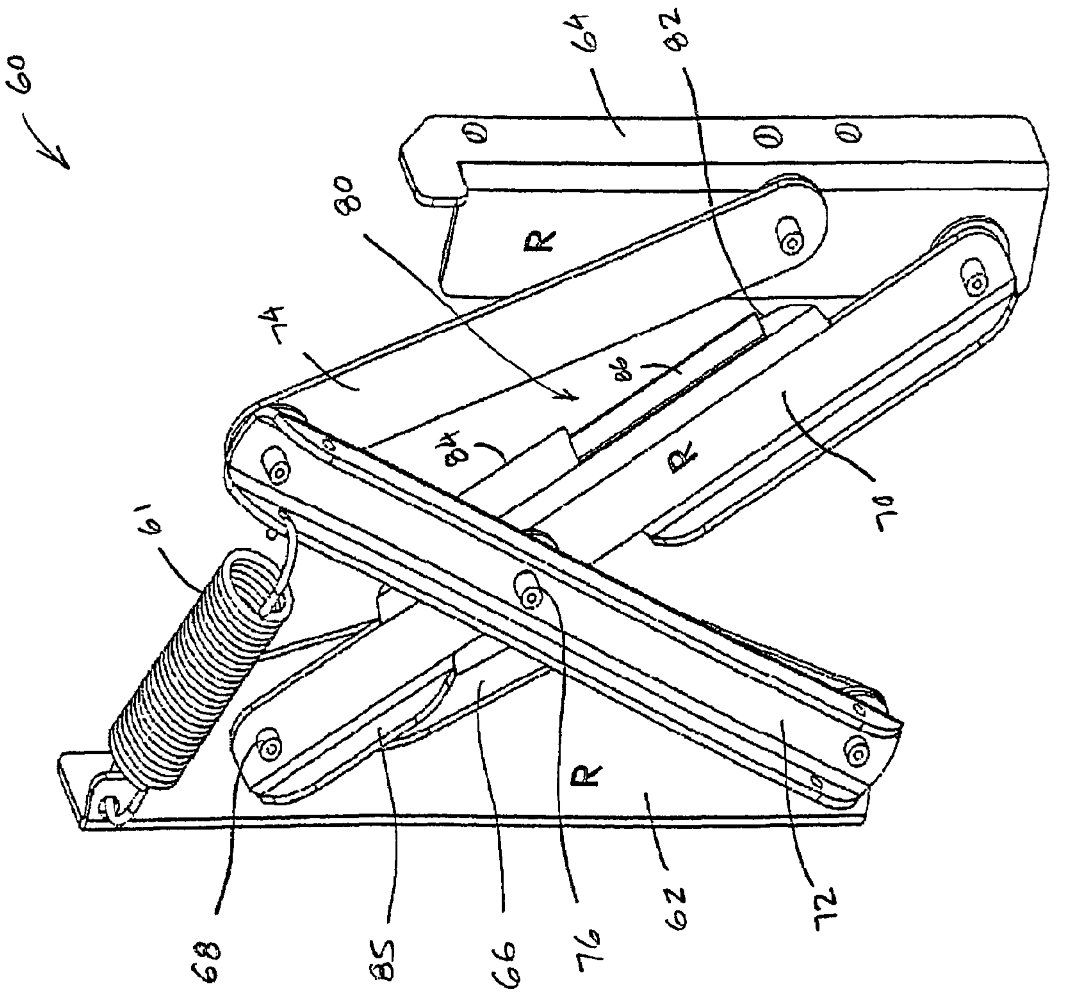
FIG. 5A is a schematic representation of a front perspective view of another portion of the access system for a display panel assembly of FIG. 1 in one position according to an embodiment.
Figure 5B:
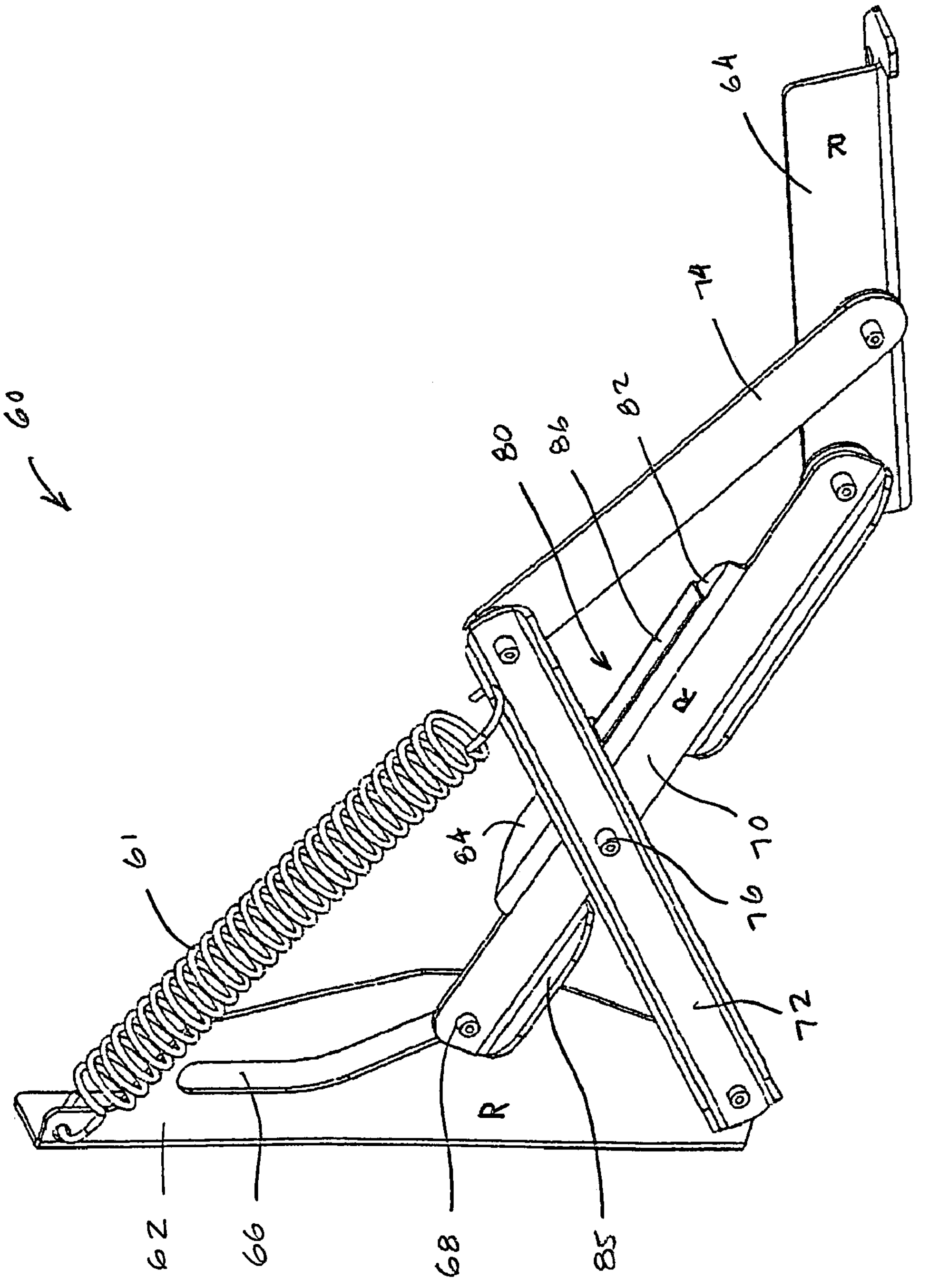
FIG. 5B is a schematic representation of a front perspective view of the portion of the access system for a display panel assembly of FIG. 5A in another position.

Referring further to FIGS. 4A and 5A, as the display panel is moved from a closed position to an open position, the slide member 68 slides along a first portion of slot 66 (shown as a generally "straight" portion) for generally translational movement of the second bracket 64 and display panel 40 in an outward direction from the closed position to a partially open position. Referring further to FIGS. 4B and 5B, as the display panel 40 is moved further toward the open position, slide member 68 moves along a second portion of slot 66 (shown as an "angled" portion) for generally rotational movement (e.g. tilting, etc.) of the second bracket 64 and display panel 40 from the partially open position to the open position. According to any alternative embodiment, the slot may have any suitable configuration (e.g. curved, with detents, etc.) and length to provide, along with the arrangement of the link members, the desired motion of the second bracket and display panel. The pivot connections between the link members and brackets may be provided by any suitable device such as a pin, bushing, rivet, adjustable threaded fastener (e.g. to allow for variable tension, etc.) or the like.

Referring further to FIGS. 4A-6C, each linkage assembly 60 is shown to include guide members shown as low friction guide members 80 according to one embodiment. First link member 70 includes a low friction guide member 80 shown as a laterally extending segment which may be integrally formed with the first link member 70 (such as having an L-shaped cross section). Guide member 80 includes a first section 82 for engaging a structural component on the case 20 as the display panel 40 is moved away from the closed position toward the open position. According to one embodiment, the structural component on the case is shown to be a vertical rib (e.g. runner, stiffener, etc.—shown as a stile 24) adjacent to each side of the case 20. As the display panel 40 reaches the open position, a second portion 84 of the guide member 80 contacts the stile 24 in an abutting manner to create an interlock between the guide member 80 and the stile 24 and acts as an alternative "stop" to support the weight of the display panel 40 and prevent the display panel 40 from opening any further. The second portion 84 of the guide member 80 may be positioned to correspond to any desired full-open position of the display panel 40. Link member 70 is also shown to include a tab 85 configured to contact link member 72 in an abutting manner to create an interlock between link members 70 and 72 as another alternative "stop" to at least partially support the weight of the display panel 40 when the display panel is in the open position. According to one embodiment, the "stops" (individually or collectively) are positioned so that the display panel 40 is held in a full-open position that may be within a range of approximately 45-115 degrees, and more particularly at approximately 85 degrees.

According to one exemplary embodiment as shown in FIGS. 4A-6C, the first portion 82 of the guide member 80 may have a substantially constant width for providing a substantially constant frictional interaction with the stile 24 of the case, and act as a "guide" providing lateral stability for minimizing the tendency for the display panel to twist or rack as the display panel is opened and closed. The first portion 82 is shown having a sleeve overlay 86 made of a wear-resistant, low-friction material (e.g. Nylon®, etc.) intended to slide smoothly along the stiles 24 with minimal frictional resistance to prevent scraping (e.g. grinding or other type of undesirable wear) between the linkage assembly and the case and for minimizing the tendency of the display panel to twist or rack as the display panel is opened and closed. A support device shown as a spring member 61 is connected between link member 72 and first bracket 62 to provide increasing support as the display panel is opened to at least partially offset the weight of the display panel, and assist with closing of the display panel. According to an alternative embodiment, other types of support devices (e.g. tension springs, gas cylinders, etc.—not shown) may be coupled to suitable link members and/or the case or display panel to provide an increasing amount of support to the display panel as the display panel is moved to the open position, and to assist in "lifting" the display panel from the open position toward the closed position.

Figure 6B:
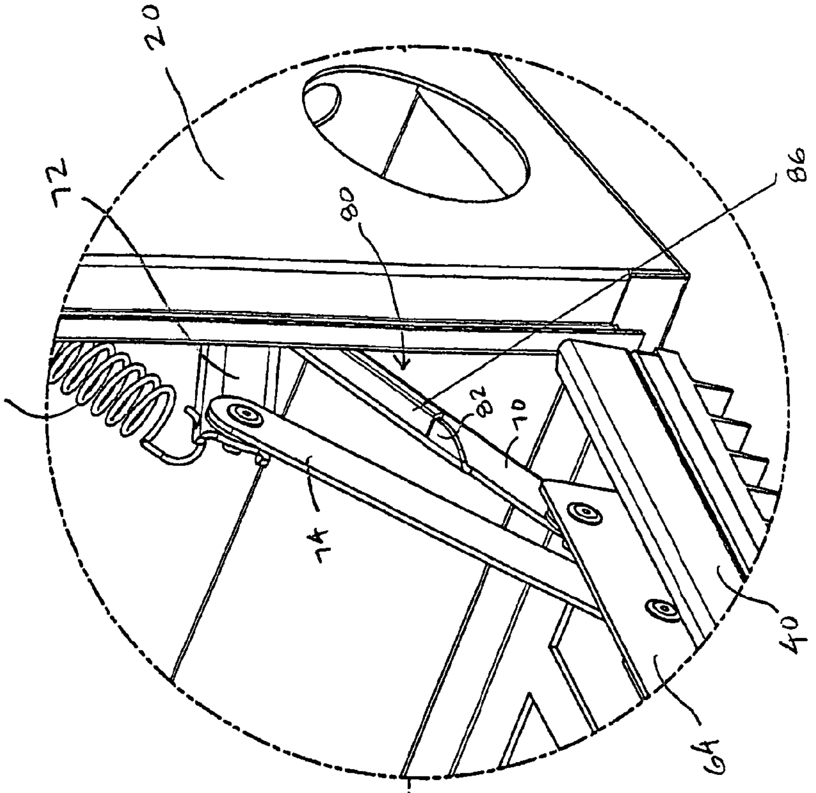
FIG. 6B is a schematic representation of a partial front perspective view of the access system for a display panel of FIG. 6A.
Figure 6A:
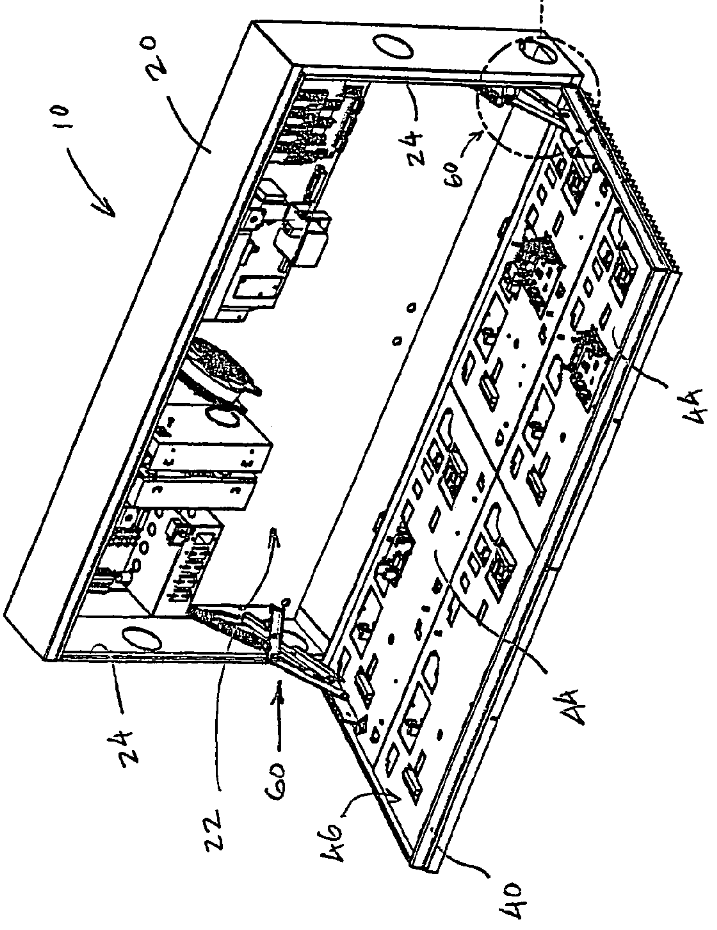
FIG. 6A is a schematic representation of a front perspective view of the access system for a display panel assembly of FIG. 1 according to an embodiment.
Figure 6D:
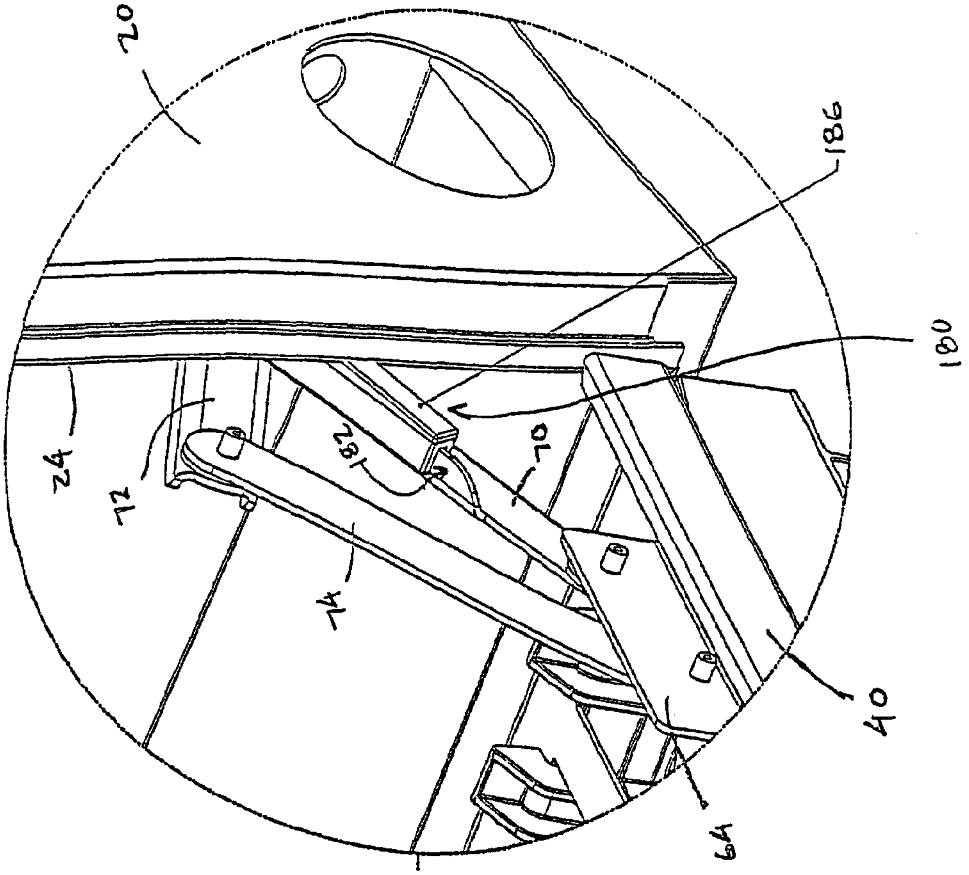
FIG. 6D is a schematic representation of a partial front perspective view of the access system for a display panel assembly of FIG. 1 according to another embodiment.
Figure 6C:
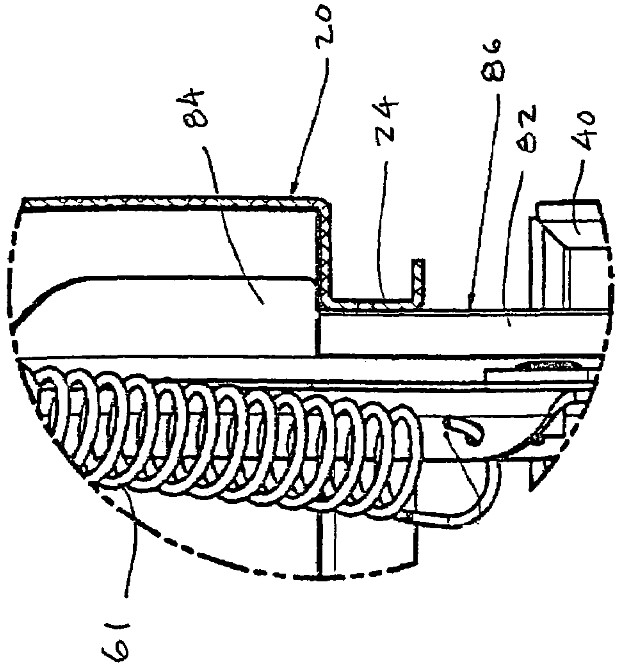
FIG. 6C is a schematic representation of a partial top view of the access system for a display panel of FIG. 6B.
Figure 6E:
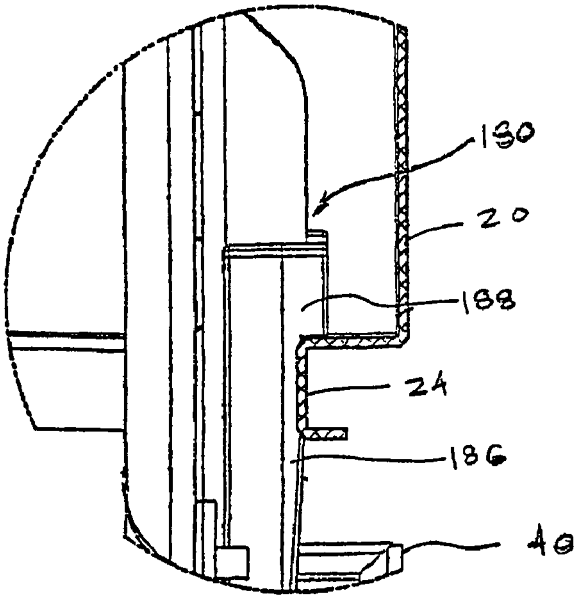
FIG. 6E is a schematic representation of a partial top section view of the access system for a display panel assembly of FIG. 6D.
Figure 6F:
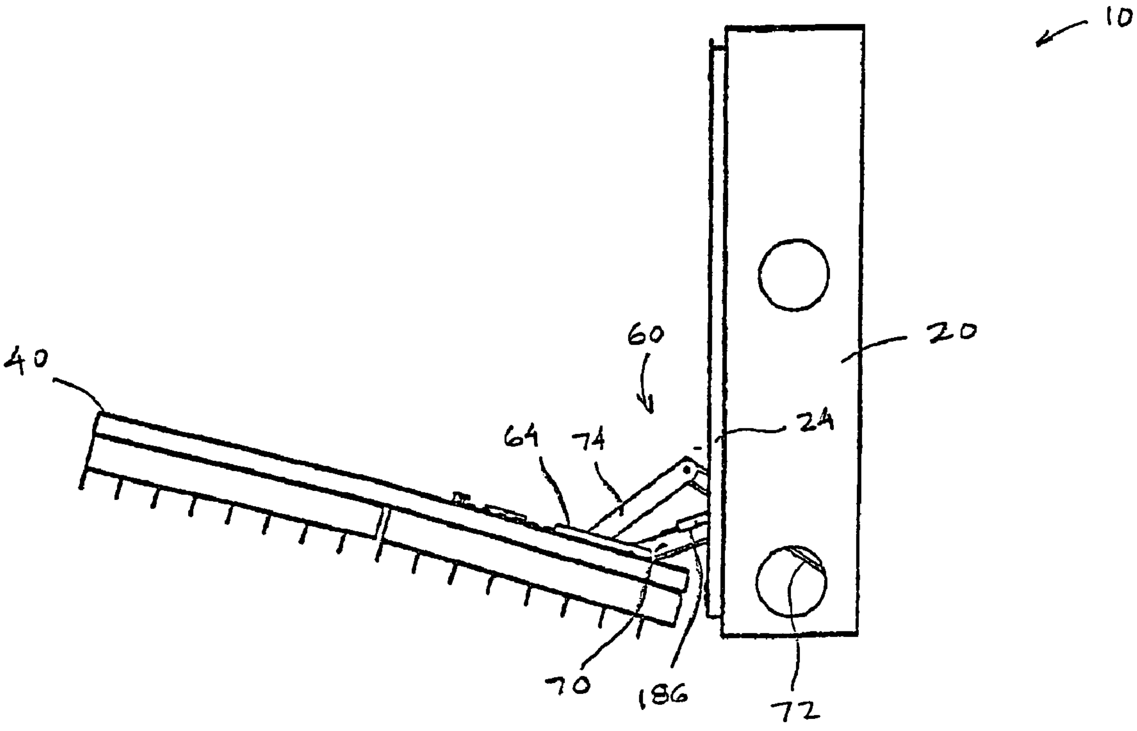
FIG. 6F is a schematic representation of a side elevation view of the access system for a display panel assembly of FIG. 6D.

According to another exemplary embodiment, as shown in FIGS. 6D-6F, each linkage assembly 60 includes guide members shown as progressive friction guide members 180 where the width of the first portion 182 of the guide member 180 may increase (e.g. in the form of a "wedge" shape, etc.) so that the frictional interaction between the first portion 182 and the stile 24 progressively increases as the display panel 40 is moved toward the open position. As the display panel 40 is moved toward the open position, the interference between the wedge-shaped first portion 182 of guide member 180 and the stile 24 on each side of the case 20 creates a generally increasing compressive force between the guide member 180 and the stile 24. The increasing "wedging" interaction created by the progressive friction guide member is intended to provide increasing support to the display panel as the display panel is moved toward the open position and the resulting distance between the case and the center of gravity of the display panel increases. The wedging interaction formed by the progressive friction guide member may be adjusted or "tuned" by adjusting the shape of the first portion of the guide member (e.g. more or less of a width increase, steepness of the wedge shape, etc.). In addition, the materials of the guide member may selected to provide desired frictional characteristics. According to one embodiment, a sleeve 186 (e.g. cover, mold-over, overlay, applique, etc.) may be installed on the guide member 180. The sleeve 186 may be provided with an increasing width (see FIGS. 6D and 6E) for creating a progressive or increasing frictional interaction with the stile 24. The sleeve 186 or the guide member 180 also preferably includes a second portion 188 that acts as a travel stop (e.g. interlock, positioner, etc.) to limit movement of the display panel to a predetermined range (e.g. from 0 degrees in the closed position to 45-115 degrees and preferably 85 degrees in the open position).

According to an embodiment using either type of guide member, an insert (e.g. strip, etc.—not shown) may be inserted within (or installed on) the stile and having a suitable length for interfacing with the guide member throughout the range of motion of the display panel. Such an insert may be a resilient material (e.g. hard rubber, Nylon®, etc.) that may be conveniently replaced if and when necessary (e.g. due to wear, damage, etc.).

According to any exemplary embodiment, the present invention provides an access system intended to permit front-access to a display panel assembly so that access to electronic or other types of components can be easily accomplished. The system includes a linkage assembly that is contained within the case and coupled to inner surfaces of the case and display panel. The linkage assembly includes brackets and link members interconnected for translational and rotational movement of the display panel between the closed and open positions. The linkage assembly also includes guide members that slidably interact with structure on the case to stabilize and at least partially support the display panel as the panel is moved towards the open position. The link members may be made from any suitable material (e.g. steel, aluminum, etc.) and the guide members may have any suitable shape to provide a constant or progressive frictional interaction with suitable structural components of the case. The frictional interface between the guide members and the structural component of the case may be enhanced, adjusted or tuned by selection of materials for use on, or in connection with, the guide members and structural component of the case.

According to alternative embodiments, the link members may have any suitable number and interconnection with the brackets to provide the desired range of motion for the display panel. The guide members and structural components of the case may include other materials intended to create a desired frictional interface. Assist devices, such as springs (compression, extension, torsion, etc.), gas cylinders or the like may be used in connection with the linkage assembly and/or the case and display panel to enhance the smooth and stable operation of the access system for opening and closing the display panel. Further the shape or profile of the "wedge" on the first portion of the progressive friction guide member may be varied as necessary to provide a desired frictional interaction for a particular display panel.

It is important to note that the construction and arrangement of the elements of the access system for a display panel assembly provided herein are illustrative only. Although only a few exemplary embodiments of the present invention (s) have been described in detail in this disclosure, those skilled in the art who review this disclosure will readily appreciate that many modifications are possible in these embodiments (such as variations in features such as panel guiding structure, components, materials, linkage configurations, shapes, dimensions, proportions and configurations of the elements of the system, without materially departing from the novel teachings and advantages of the invention(s). Further, it is readily apparent that variations and modifications of the access system and its components and elements may be provided in a wide variety of materials, types, shapes, sizes and performance characteristics. For example, the linkage members of the hinge assembly may be provided in any suitable shape and with any suitable slot configuration for providing the desired range of motion for the display panel during opening and closing movement. Accordingly, all such variations and modifications are intended to be within the scope of the invention(s).

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions maybe made in the design, operating configuration and arrangement of the preferred and other exemplary embodiments without departing from the spirit of the inventions as expressed in the appended claims.

What is claimed is:

1. An access system for a display panel assembly, comprising: a case; an LED display panel coupled to a front of the case for movement between a closed position and an open position; a linkage assembly coupled to an inside surface of the case and an inside surface of the LED display panel, the linkage assembly configured to move the LED display panel in a first generally non-rotational direction and a second generally rotational direction; the linkage assembly comprising: a first bracket having a slot formed therein and coupled to the inside surface of the case; a second bracket coupled to the LED display panel; a first link having a first end with a slide member configured for movement within the slot and a second end coupled to the second bracket; a second link having a first end pivotally coupled to the first bracket and a second end pivotally coupled to a third link and wherein the third link is pivotally coupled to the second bracket; and wherein at least one of the links includes an L-shaped cross section defining a first leg and a second leg, the first leg having a guide member that slides along a structural portion of the case as the LED display panel is moved from the closed position to the open position.

2. The system of claim 1 wherein the guide member is configured to provide a substantially constant frictional interaction between the linkage assembly and the structural portion of the case as the LED display panel is moved from the closed position to the open position.

3. The system of claim 2 further comprising a spring member configured to provide increasing support to the display panel as the display panel is moved from the closed position to the open position.

4. The system of claim 1 wherein the guide member comprises a wedge shaped portion configured to provide a progressive frictional interaction between the linkage assembly and the structural portion of the case as the LED display panel is moved from the first position to the second position.

5. The system of claim 1 wherein the structural portion of the case is a stile.

6. An access system for an LED display panel assembly, comprising:

an enclosure;

a display configured to cover a front opening of the enclosure and movable between a closed position and an open position to provide access to components installed on at least one of the enclosure and the display panel;

a linkage mechanism coupled to the enclosure and the display panel and configured for generally translational movement of the display panel from the closed position to a partially open position and for generally rotational movement of the display panel from the partially open position to the open position; and the linkage assembly including a link having a segment with an L-shaped cross section defining a laterally extending guide member configured to slidably engage a sidewall component of the enclosure as the display panel is moved between the closed position and the open position.

7. The system of claim 6 wherein the guide member is configured to provide a substantially constant frictional interaction with the structural component of the enclosure.

8. The system of claim 6 wherein the guide member is configured to provide a wedging interaction with the structural component of the enclosure.

9. The system of claim 6 wherein the guide member further comprises a sleeve formed from a material configured to create a frictional interaction with the structural component of the enclosure.

10. The system of claim 6 wherein the guide member further comprises a first portion for slidably engaging the structural component of the enclosure and a second portion for interlocking with the structural component of the enclosure to prevent movement of the display panel beyond the open position.

11. The system of claim 6 wherein the open position is within the range of approximately 45-115 degrees.

12. A system for accessing internal electrical components of an LED display panel assembly, comprising:

a case;

a display panel having a plurality of LEDs on an outer surface and electrical components on an inner surface;

a linkage assembly coupled to the case and the display panel and configured for generally translational and generally rotational movement of the display panel from a closed position to an open position for accessing the electrical components, the linkage assembly comprising a link having a portion defining an outwardly extending stepped guide member with a first portion having a first width for slidably engaging a portion of the case as the display panel is moved from the closed position to the open position, and a second portion having a second width that interlocks with the portion of the case when the display panel is in the open position.

13. The system of claim 12 wherein the linkage assembly is configured to move the display panel in an outward direction from the closed position to a partially open position to provide clearance with an adjacent display panel.

14. The system of claim 13 wherein the linkage assembly is configured to rotate the display panel from the partially open position to the open position.

15. The system of claim 12 wherein the first portion comprises a wedge shaped member configured to engage the portion of the case in a progressive frictional interaction.

16. The system of claim 12 wherein the first portion is configured to engage the portion of the case in a substantially constant frictional interaction.

17. The system of claim 16 further comprising a spring member configured to at least partially support the display panel.

18. The system of claim 12 wherein the linkage assembly includes at least a first link member having a tab configured to interlock with a second link member to at least partially support the display panel in the open position.

* * * * *